Oct. 28, 1969  L. F. HOWARD ET AL  3,475,658
SOLID TANTALUM CAPACITOR AND METHOD OF MAKING SAME
Filed Jan. 18, 1967

INVENTORS
PAUL J. CHRISTIANSEN
LOWELL F. HOWARD
BY
*Robert Levine*
ATTORNEY

United States Patent Office 3,475,658
Patented Oct. 28, 1969

3,475,658
SOLID TANTALUM CAPACITOR AND METHOD OF MAKING SAME
Lowell F. Howard, Wappingers Falls, N.Y., and Paul J. Christiansen, Indianapolis, Ind., assignors to P. R. Mallory & Co. Inc., Indianapolis, Ind., a corporation of Delaware
Filed Jan. 18, 1967, Ser. No. 610,047
Int. Cl. H01g 9/05
U.S. Cl. 317—230                                12 Claims

ABSTRACT OF THE DISCLOSURE

A tantalum riser extending through a capacitor's ceramic end closure is hermetically sealed to the closure and metallized along its outer periphery. The riser is connected to a processed anode and inserted in a bath of solder held in a cup-shaped metal case. A hermetic seal is then formed between the closure's outer periphery and the metal case at its mouth.

---

Solid electrolyte tantalum capacitors are being employed instead of commonly used aluminum capacitors for many applications. One is the size advantage. Tantalum units having a given capacitance rating can be manufactured so as to be smaller than aluminum electrolytic capacitors having the same rating. Thus miniature single case tantalum capacitors find many uses in varied types of electronic circuits.

Their miniature size, however, leads to fabrication problems. First of all, many hundreds of thousands of a single unit must be produced in an economical manner. Secondly, such capacitors need to be hermetically sealed in order that they may perform effectively under other than ordinary temperature and humidity conditions and also so that the penetration of other contaminates is prevented.

Another problem encountered in the fabrication of these miniature units is that of achieving a high volumetric efficiency that is, maximum utilization of the capacitors volume. In prior art solid tantalum miniature capacitors, one of the fabricating techniques that detracts from such volumetric efficiency is that of connecting the electrical lead to the tantalum wire riser extending from the anode by a welded connection inside the capacitor case. Since a welded connection will inherently cause impurities to be developed in the area of the weld, such area must then be left clear of the capacitor's components.

The present invention is concerned with the fabrication of solid electrolyte tantalum capacitors of miniature size and has among its objects the provision of such a capacitor having increased volumetric efficiency.

Another object of the invention is the provision of such a capacitor which is hermetically sealed.

Another object of the invention is the provision of such a capacitor wherein the electrical lead is connected to a tantalum riser outside the capacitor case.

Still another object of the invention is to provide a method of fabrication of such a capacitor.

Yet another object of the invention is to provide a method of fabricating such a capacitor which is economical and reliable.

Still another object of the invention is to provide a method of fabricating such a capacitor wherein a ceramic to metal seal is provided for a tantalum riser.

Another object of the invention is to provide a method of fabricating such a capacitor wherein the electrical lead can be welded to the tantalum riser extending from the capacitor after the capacitor has been hermetically sealed.

With the above and other objects in view which will appear as the description proceeds, this invention resides in a method for manufacturing a miniature solid electrolyte tantalum capacitor and the capacitor produced thereby, substantially as described herein and more particularly defined by the appended claims, it being understood that such changes in the precise embodiment of the invention heredisclosed may be made as come within the scope of the claims.

Figure 1:
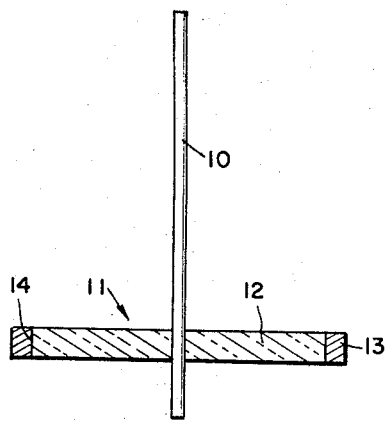
Figure 2:
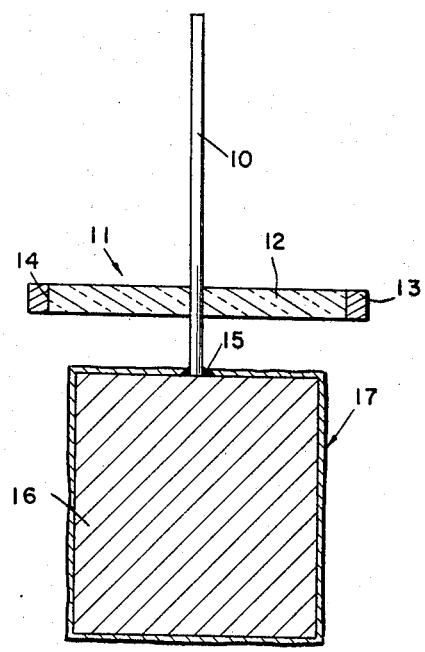
Figure 3:
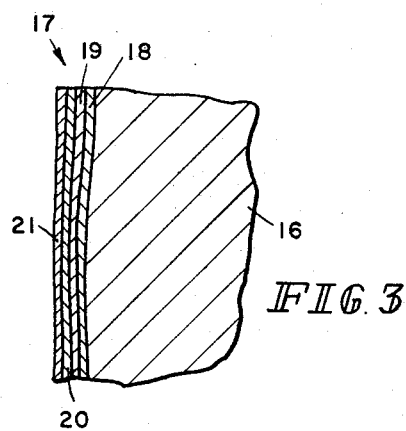
Figure 5:
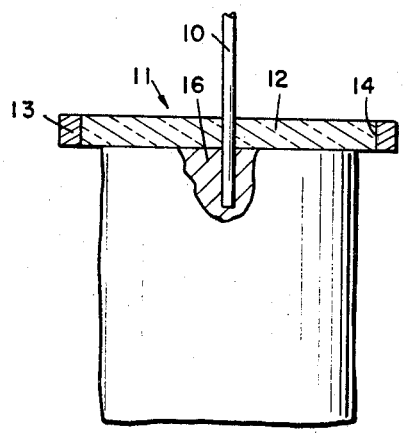
Figure 4:
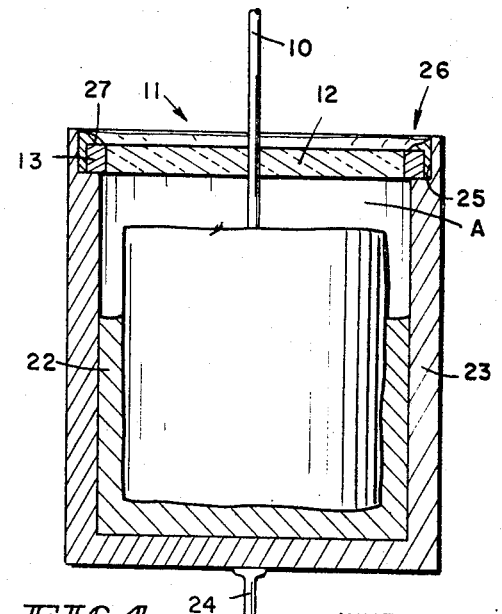

In the accompanying drawings:
FIGURE 1 is a cross section of the riser extending through a capacitor end closure;
FIGURE 2 is a cross section of the riser and the end closure connected to an anode pellet;
FIGURE 3 is an enlarged cross section of a portion of the anode of FIGURE 2;
FIGURE 4 is a cross section of a completed solid electrolyte tantalum capacitor made in accordance with the invention; and,
FIGURE 5 is a cross section of an alternate embodiment of the capacitor.

Generally speaking, the objects of the invention are accomplished by providing a method of fabricating a miniature solid electrolyte tantalum capacitor which comprises forming a metal to ceramic hermetic seal between a ceramic disc and a tantalum wire extending through the disc, applying a metallic coating on the outer periphery of the disc, connecting one end of the tantalum wire to a porous tantalum anode, procesing the tantalum anode by first anodizing it to a preselected voltage and then applying cathodic contact elements to the anodized anode, forming a melt of solder in a metal case having a negative electrical lead attached thereto, immersing the processed tantalum anode in the melt, cooling the melt, and forming a hermetic seal between the disc and the metal case at the disc's metallized outer periphery.

By following this step by step procedure, a hermetically sealed capacitor can be made which will have increased volumetric efficiency, and further permits the electrical lead to the capacitor to be welded to the tantalum wire riser after the capacitor has been sealed. In addition, the use of the ceramic disc as the end closure prevents electrical short-circuiting from the tantalum wire riser to the metal case.

Thus the present method of forming miniature solid electrolyte capacitors yields a novel capacitor structure which in its broadest aspect comprises a cup-shaped metal case acting as a cathode and having an electrical lead attached thereto, a ceramic disc disposed at the mouth of the case to partially close the same, a tantalum riser extending through an aperture in the disc and being hermetically sealed thereto, the disc having a metallizing coating around its outer periphery and being hermetically sealed to the metal case at its periphery, an anodized tantalum pellet fabricated of pressed and sintered metallic powder connected to the riser and disposed within the metal case, a semiconducting oxide making contact with the anode pellet, and cathodic connecting means disposed between and making contact with the semiconducting oxide and the metal case.

Referring now to FIGURE 1, a tantalum wire riser 10 is extended through an end closure 11 through a centrally located aperture in the closure. The closure consists of a disc 12 fabricated from a suitable ceramic such as alumina or glass-bonded mica. A hermetic seal is formed between the riser 10 and the disc 12 at the aperture through heat and pressure. Next the disc is intimately coated at its outer periphery 14 with a metal 13 such as platinum for example. Such metallizing aids in securing a hermetic seal between the ceramic disc and the capacitor's metal case. The coating can be found in a variety of ways—one of which comprises painting a mixture of a platinum alloy, for example, directly onto the outer periphery 14.

Next, the disc with the riser is connected to, as shown in FIGURE 2, a pressed and sintered porous anode 16, the connection being made through weld 15. The anode is then processed by first anodizing it to a preselected voltage and then applying cathodic contact elements to it so as to form the means 17 for completing the electrical circuit between the capacitor's cathode and anode 16. Referring to FIGURE 3, the means 17 for completing the electrical circuit is formed by first anodizing the anode 16 to form an insulating dielectric film 18 on the anode by dipping the anode into a suitable solution such as sulfuric acid and applying a potential across the anode pellet and a cathodic connection, for example. Next, a semiconducting film or coating 19 acting as the electrolyte is formed. A suitable semiconducting material could be manganese dioxide, for example, formed by dipping the pellet in a solution of manganese nitrate and thermally converting the manganese nitrate into manganese dioxide. Next a coating of graphite 20 or other suitable material is formed over the semiconducting film or coating 19 in order to lower the electrical resistance of the system. The coating is applied by dipping the anode in a graphite suspension. Finally, a silver coating 21 is applied to form the cathode of the capacitor. This is done by dipping the anode in a dispersion of silver and organic binders and solvents such as toluene, for example.

Referring to FIGURE 4, a melt of solder 22, silver for example, is formed in a cup-shaped metal case 23 having a negative lead 24 attached thereto. The case is constructed of a metal such as silver, for example, so as to act as a cathode. Processed anode 16 with its electrical connecting means 17 is immersed in the melt and the melt is then allowed to cool. The case is then hermetically sealed by seating the disc 12 in the recessed portion 25 forming the mouth 26 of the case and then melting a preformed solder ring around the periphery of the disc to form a soldered joint 27.

With the capacitor being constructed in this manner, the weld needed to connect the tantalum riser 10 to an electrical lead can be made after the capacitor case has been sealed. Thus the weld can be made outside the capacitor case. This permits more effective utilization of the space A in the capacitor. This markedly increases the volumetric efficiency of the capacitor. In addition the use of the ceramic disc 12 prevents electrical short-circuiting from the tantalum riser to the cathode metal case.

FIGURE 5 shows another embodiment of the invention wherein even greater volumetric efficiency is achieved. Referring to the figure, the tantalum wire riser 10 is pressed into the pressed and sintered anode 16, thus eliminating the need for the welded connection 15 of FIGURE 2. Thus with this arrangement, the anode 16 is disposed against the disc 12, thus completely eliminating the space A of FIGURE 4.

From the foregoing description taken in conjunction with the accompanying figures of the drawing, it will be readily apparent to those skilled in the art that this invention provides a new and useful solid electrolyte, miniature capacitor and a method of making the same. Accordingly, it is contemplated that the scope of the invention is to be determined from the following appended claims.

What is claimed is:
1. A method of forming a solid electrolyte tantalum capacitor so as to increase its volumetric efficiency which comprises:
  (a) forming a metal to ceramic hermetic seal between a ceramic disc and a tantalum wire extending through said disc;
  (b) applying a metallic coating on the outer periphery of said disc;
  (c) connecting one end of said tantalum wire to a porous tantalum anode;
  (d) processing said tantalum anode by first anodizing it to a preselected voltage; forming a semiconducting oxide electrolyte on the anodized surface of the anode, and then applying cathodic contact elements to said anode;
  (e) forming a melt of solder in a metal case having a recessed portion at the outer periphery thereof and an electrical lead attached thereto which acts as the capacitor's cathode;
  (f) immersing said processed tantalum anode in said melt;
  (g) cooling said melt; and
  (h) forming a hermetic seal between said disc and said metal case at said disc's metallized outer periphery.

2. A method of forming a solid electrolyte tantalum capacitor so as to increase its volumetric efficiency which comprises:
  (a) forming a metal to ceramic hermetic seal between a ceramic disc and a tantalum wire extending through said disc by the application of heat and pressure;
  (b) applying a metallic coating on the outer periphery of said disc by painting said metal on said disc;
  (c) welding one end of said tantalum wire to a pressed and sintered tantalum anode;
  (d) processing said anode by first anodizing it to a preselected voltage; forming a semiconducting oxide electrolyte on the anodized surface of the anode, and then applying cathodic contact elements to said anode;
  (e) forming a melt of solder in a metal case having a recessed portion at the outer periphery thereof and an electrical lead attached thereto which acts as the capacitor's cathode;
  (f) immersing said processed tantalum anode in said melt;
  (g) cooling said melt; and
  (h) forming a soldered joint between said disc and said metal case at said disc's metallized outer periphery;
  (i) said tantalum anode being immersed in said bath and being welded to the end of said tantalum wire in such a manner as to provide a space between said anode and said disc;

3. A method of forming a solid electrolyte tantalum capacitor so as to increase its volumetric efficiency which comprises:
  (a) forming a metal to ceramic hermetic seal between a ceramic disc and a tantalum wire extending through said disc by the application of heat and pressure;
  (b) applying a metallic coating on the outer periphery of said disc by painting said metal on said disc;
  (c) pressing one end of said tantalum wire into a pressed and sintered tantalum anode;
  (d) processing said anode by first anodizing it to a preselected voltage; forming a semiconducting oxide electrolyte on the anodized surface of the anode, and then applying cathodic contact elements to said anode;
  (e) forming a melt of solder in a metal case having a recessed portion at the outer periphery thereof and an electrical lead attached thereto which acts as the capacitor's cathode;
  (f) immersing said processed anode in said melt;
  (g) cooling said melt;
  (h) forming a soldered joint between said metal case at said disc's metallized outer periphery;
  (i) said tantalum anode being immersed in said bath such that with said tantalum wire being pressed into said anode, said anode is disposed against said disc.

4. A method for forming a solid electrolyte tantalum capacitor according to claim 2 in which said disc is metallized with a platinum based coating.

5. A method for forming a solid electrolyte tantalum capacitor according to claim 2 in which said processing of said tantalum anode includes:
  (a) forming an insulating dielectric film on said anode;

(b) forming a semiconducting film on said dielectric film;
(c) forming a coating of material over said semiconducting film to lower the electrical resistance of the system; and
(d) forming a cathode film over said coating of material which lowers the electrical system.

6. A method for forming a solid electrolyte tantalum capacitor according to claim 3 in which said disc is metallized with a platinum based coating.

7. A method for forming a solid electrolyte tantalum capacitor according to claim 3 in which said processing of said tantalum anode includes:
(a) forming an insulating dielectric film on said anode;
(b) forming a semiconducting film on said dielectric film;
(c) forming a coating of material over said semiconducting film to lower the electrical resistance of the system; and
(d) forming a cathode film over said coating of material which lowers the electrical system.

8. A solid electrolyte tantalum capacitor which comprises a cup-shaped metal case having a recessed portion at the outer periphery thereof acting as a cathode with an electrical lead attached thereto, a ceramic disc disposed at the mouth of said case to partially close the same, a terminal lead extending through an aperture in said disc and being hermetically sealed thereto, said disc having a metallizing coating around its outer periphery and being hermetically sealed to said metal case at its periphery in said recessed portion through a soldered joint, an anodized tantalum pellet fabricated of pressed and sintered metallic powder connected to said terminal lead and disposed within said metal case, a semiconducting oxide electrolyte making contact with said anode pellet, and cathodic connecting means disposed between and making contact with said semiconducting oxide electrolyte and said metal case.

9. A solid electrolyte tantalum capacitor which comprises a cup-shaped metal case having a recessed portion at the outer periphery thereof acting as a cathode and having an electrical lead attached thereto, a ceramic disc disposed at the mouth of said case to partially close the same, a terminal lead extending through an aperture in said disc and being hermetically sealed thereto, said disc having a metallizing coating around its outer periphery and being hermetically sealed to said metal case at its periphery in said recessed portion through a soldered joint, an anodized tantalum pellet fabricated of pressed and sintered metallic powder welded to one end of said terminal lead and being disposed within said metal case in spaced relation to said ceramic disc, a semiconducting oxide electrolyte making contact with said anode pellet, and cathodic connecting means disposed between and making contact with said semiconducting oxide electrolyte and said metal case.

10. A solid electrolyte tantalum capacitor which comprises a cup-shaped metal case having a recessed portion at the outer periphery thereof acting as a cathode and having an electrical lead attached thereto, a ceramic disc disposed at the mouth of said case to partially close the same, a tantalum riser extending through an aperture in said disc and being hermetically sealed thereto, said disc having a metallizing coating around its outer periphery and being hermetically sealed to said metal case at its periphery in said recessed portion through a soldered joint, an anodized tantalum pellet fabricated of pressed and sintered metallic powder, said riser being impressed within said pellet such that said pellet is disposed against said disc within said case, a semiconducting oxide electrolyte making contact with said anode pellet, and cathodic connecting means disposed between and making contact with said semiconducting oxide electrolyte and said metal case.

11. A solid electrolyte tantalum capacitor according to claim 9 in which said metallized coating consists of a platinum based alloy.

12. A solid electrolyte tantalum capacitor according to claim 10 in which said metallized coating consists of a platinum based alloy.

References Cited

UNITED STATES PATENTS

| 1,281,917 | 10/1918 | Eby | 317—230 X |
| 2,307,561 | 1/1943 | Bailey | 317—230 |
| 3,275,901 | 9/1966 | Merritt | 317—230 |
| 3,314,124 | 4/1967 | Okamato | 317—230 |
| 3,337,429 | 8/1967 | Zind | 317—230 |

JAMES D. KALLAM, Primary Examiner

U.S. Cl. X.R.

29—570